United States Patent
Hsieh et al.

(10) Patent No.: US 8,306,540 B2
(45) Date of Patent: Nov. 6, 2012

(54) SYSTEM AND METHOD FOR PROCESSING CONNECTION FROM MACRO CELLULAR BASE STATION TO MINI TYPE BASE STATION

(75) Inventors: Ching-Feng Hsieh, Taipei (TW); Weilin Wu, Shanghai (CN)

(73) Assignee: Askey Computer Corporation, Taipei (TW)

( * ) Notice: Subject to any disclaimer, the term of this patent is extended or adjusted under 35 U.S.C. 154(b) by 202 days.

(21) Appl. No.: 12/832,763

(22) Filed: Jul. 8, 2010

(65) Prior Publication Data

US 2011/0244828 A1   Oct. 6, 2011

(30) Foreign Application Priority Data

Apr. 2, 2010   (TW) ............................... 99110290 A

(51) Int. Cl.
*H04W 36/00* (2009.01)
(52) U.S. Cl. ........ 455/444; 455/411; 455/438; 455/439; 455/436; 455/524
(58) Field of Classification Search .................. 455/444, 455/411, 438, 439, 436, 524, 525, 552.1
See application file for complete search history.

(56) References Cited

U.S. PATENT DOCUMENTS

| | | | |
|---|---|---|---|
| 2008/0207170 A1* | 8/2008 | Khetawat et al. | 455/411 |
| 2009/0288152 A1* | 11/2009 | Huber et al. | 726/6 |
| 2010/0056145 A1* | 3/2010 | Hashimoto et al. | 455/435.2 |
| 2010/0214956 A1* | 8/2010 | Law et al. | 370/255 |
| 2010/0260068 A1* | 10/2010 | Bhatt et al. | 370/254 |
| 2011/0269427 A1* | 11/2011 | Kurokawa et al. | 455/411 |
| 2012/0015655 A1* | 1/2012 | Lee | 455/435.1 |

* cited by examiner

*Primary Examiner* — Ajit Patel
*Assistant Examiner* — Khai M Nguyen

(57) ABSTRACT

A system and a method for connecting macro cellular base stations into mini type base stations are applicable to a mobile communication apparatus having a covering range provided by macro cell base stations upon entering into a range provided by mini type base stations for automatic switching. The method includes establishing a database stored with information related to a geographic distribution for mini type base stations and a listing of authorized admission for allowing mobile communication apparatus to enter; acquiring the geographic area of the mobile communication equipment in order to search the database for at least one mini type base station based on International Mobile Subscriber Identity of the mobile communication apparatus for allowing the mobile communication apparatus to enter into the searched mini type base station from the macro cell base stations for communication.

14 Claims, 4 Drawing Sheets

SYSTEM AND METHOD FOR PROCESSING CONNECTION FROM MACRO CELLULAR BASE STATION TO MINI TYPE BASE STATION

BACKGROUND OF THE INVENTION

1. Field of the Invention

The present invention relates to a handover technique provided in switching to different communication systems, and more particularly, to a system and method for processing connection from a macro cellular base station to a mini type base station such as, a Femtocell base station.

2. Description of the Prior Art

Functionality of individual base stations in a wireless communication network system usually depends on the flow and features of the locations where the base stations are situated at. For example, macro cell base stations covered a large coverage are utilized in an area with sparsely distributed population and for high-speed users so as to increase the area of coverage. Conversely, a region with high density of skyscrapers and a plenty mobile communication users per building is confronted with a problem, that is the indoor areas of those buildings are poorly covered by the macro cell system network. Also, given a large number of mobile communication users, the capacity of the macro cell system tends to be inadequate.

Femtocell base stations are regarded as a way to expand the coverage of a mobile communication network and the enhancement of system's capacity, in which the Femtocell base stations can effectively overcome the aforesaid problems resulting from the macro cell base stations. However, in practice, the integration of a macro cell system and a femtocell system is seldom easily achieved. As a matter of fact, the base stations or access point devices of the femtocell system are required in a large number, further, the femtocell starts and shuts down independently and randomly. Therefore, it is impossible to acquire, in advance, any messages and operating parameters of the base station or access point devices that are closer to a nearby femtocell system which is covered within the coverage of the macro cell system; as a result, the position information of the base station or the access point device operating under the femtocell system cannot be notified to the mobile communication apparatus. In other words, after the mobile communication apparatus moves out from the coverage of the macro cell system into the coverage of the femtocell system, the mobile communication apparatus cannot stop receiving a signal from the macro cell system and start receiving a signal from the femtocell system, that is, when the macro cell system and the femtocell system integrated together, it cannot effectively switch between the macro cell system and the femtocell system.

Accordingly, it is imperative to devise a technique of switching between a macro cell system and a femtocell system.

SUMMARY OF THE INVENTION

In light of the aforesaid drawbacks of the prior art, it is an objective of the present invention to provide a system and method for processing connection from a macro cell base station to a mini type base station, so that a mobile communication apparatus moving out from the coverage of the macro cell base station and falling within the coverage of the mini type base station can stop receiving a signal from the macro cell base station and start receiving a signal from the mini type base station.

To achieve the above and other related objectives, the present invention provides a system and method for processing connection from a macro cell base station to a mini type base station. The system of the present invention processes the connection from the macro cell base station to the mini type base station so that the automatic execution of handover is achieved as soon as the mobile communication apparatus moves out of the coverage of the macro cell base station into the coverage of the mini type base station. The system of the present invention comprises: a database for storing information related to a geographic distribution for all the mini type base stations and a list of the mini type base stations for permitting authorized admission of the mobile communication apparatus; a receiving module for receiving detected information related to a geographic area of the mobile communication apparatus and International Mobile Subscriber Identity (IMSI) of the mobile communication apparatus; and a searching module for searching the database for at least one of the mini type base stations distributed across the geographic area of the mobile communication apparatus according to the geographic area information and the IMSI of the mobile communication apparatus received by the receiving module so that the communication signals of the mobile communication apparatus are switched from the macro cell base station to one of the searched mini type base stations.

In another embodiment of the present invention, the system further comprises a selecting module for selecting the mini type base stations which are distributed across the geographic area of the mobile communication apparatus and permit an authorized admission of the mobile communication apparatus according to all the mini type base stations distributed across the geographic area of the mobile communication apparatus searched by the searching module from the database and the authorized admission list stored in the database, and creating a conversion table in accordance with the selected mini type base stations and the macro cell base station currently offering the communication service to the mobile communication apparatus in order to allow the communication signals of the mobile communication apparatus to be switched from a macro cell base station to one of the mini type base stations in the conversion table, so as for the mobile communication apparatus to communicate with the admitting mini type base station after the conversion.

In the system, the selecting module enables the mobile communication apparatus to conduct a survey on communication condition according to the mini type base stations in the conversion table and switch communication signals of the mobile communication apparatus from the macro cell base station to one of the mini type base stations according to a survey result fed back by the mobile communication apparatus, provided that the communication condition survey is satisfactorily conducted on the one of the mini type base stations, so as for the mobile communication apparatus to communicate with the mini type base station that passes the communication condition survey.

The method for processing connection from a macro cell base station to a mini type base station according to the present invention is configured for use in a communication network system comprising a plurality of macro cell base stations, a plurality of mini type base stations, and a mobile communication apparatus. The method comprises the steps of: (1) creating a database in the communication network system for storing information related to a geographic distribution for the mini type base stations and a list of the mini type base stations permitting authorized admission of the mobile communication apparatus; (2) detecting information related to a geographic area of the mobile communication apparatus and acquiring IMSI of the mobile communication apparatus; (3) searching the database for at least one of the mini type base stations distributed across the geographic area of the mobile communication apparatus; and (4) switching the mobile communication apparatus to at least one of the mini type base stations that is distributed across the geographic area of the mobile communication apparatus permitting authorized admission of the mobile communication apparatus according to the searched at least one mini type base station and the authorized admission list stored in the database.

In another embodiment of the present invention, the system switches the mobile communication apparatus to one of the mini type base stations that is distributed across the geographic area of the mobile communication apparatus to permitting authorized admission of the mobile communication apparatus according to one of the searched mini type base stations and the authorized admission list stored in the database to create a conversion table in accordance with the selected mini type base stations and the macro cell base station currently offering the communication service to the mobile communication apparatus, and conducting a survey on communication condition according to the mini type base stations in the conversion table so as to switch the communication signal of the mobile communication apparatus from the macro cell base stations to the mini type base stations that are passed the communication condition survey according to a survey result and for the mobile communication apparatus in order to communicate with those mini type base stations passed the communication condition survey.

In conclusion, with a system and method for switching from a macro cell base station to a mini type base station according to the present invention, it is feasible to switch a mobile communication apparatus from the coverage of a macro cell base station to the coverage of a mini type base station automatically.

DETAILED DESCRIPTION OF THE EMBODIMENTS

The present invention is herein illustrated with specific embodiments, so that one skilled in the pertinent art can easily understand other advantages and effects of the present invention from the disclosure of the invention.

Also, the present invention is illustrated with simple schematic drawings to let persons skilled in the art gain insight into the basic principles of the present invention. In practice, the form, quantity, and proportion of elements of a system of the present invention are subject to changes as needed.

Figure 1A:
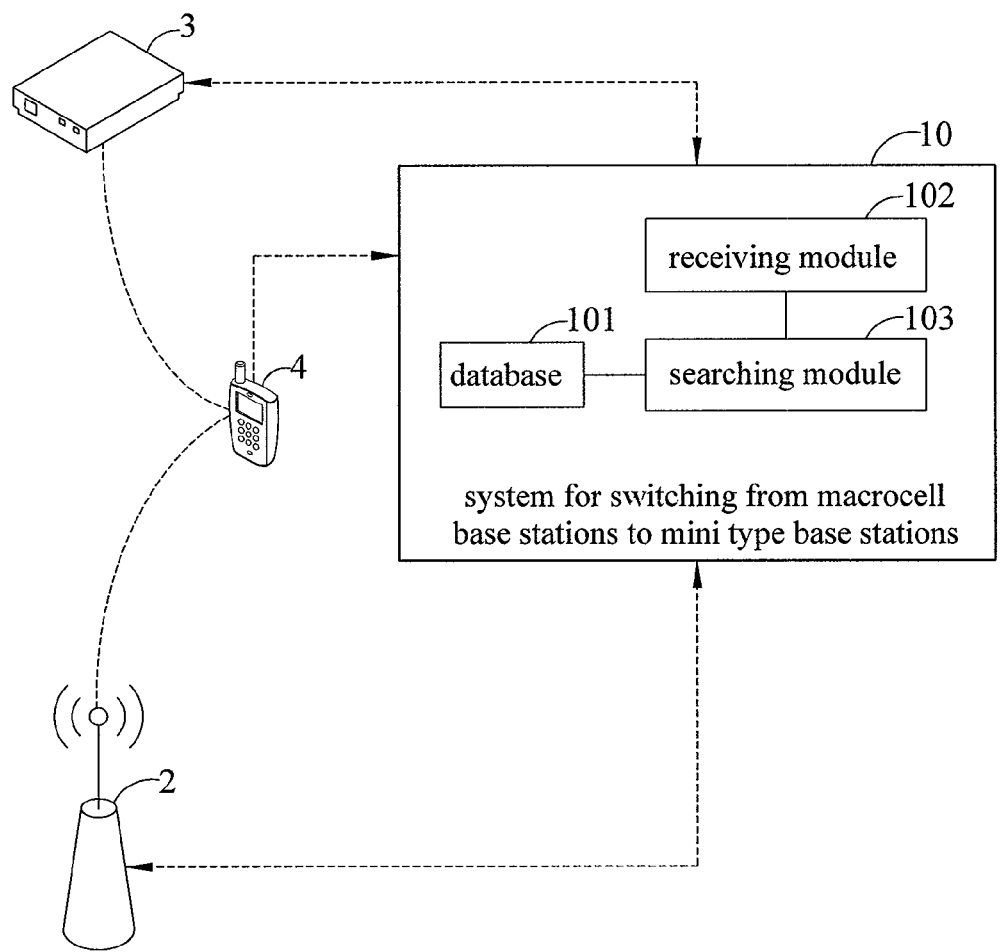
FIG. 1A is a block diagram of a system for processing connection from a macro cell base station to a mini type base station in accordance with an embodiment of the present invention.

Referring to FIG. 1A, a block diagram of a system 10 for processing connection from a macro cell base station to a mini type base station according to an embodiment of the present invention is shown. As shown in the drawing, the system 10 for processing connection from a macro cell base station to a mini type base station according to the embodiment of the present invention enables an automatic execution of handover once the mobile communication apparatus 4 moves out from the coverage of a macro cell base station 2 and falls within the coverage of a mini type base station 3, such as a Femtocell base station, so that the original service received by the mobile communication apparatus 4 is maintained rather than interrupted. The macro cell base station 2, the mini type base station 3 and the mobile communication apparatus 4 in this embodiment are recited in the singular term for the purpose of a clear demonstration how the claimed method switches and operates between different types of base stations.

In this embodiment, the system 10 for switching from a macro cell base station to a mini type base station according to the present invention is capable of applying to 3G mobile communication network system, whereas a list of local base stations that permit authorized admission of the mobile communication apparatus 4 is stored in the mini type base station 3 and the macro cell base station 2. Hence, in this embodiment, the mobile communication apparatus 4 has the qualification for a registered user of a mini type system and a macro cell system. The mobile communication apparatus 4 is exemplified by a mobile terminal of WCDMA and TD-SCDMA, applicable to 3GPP Release 99, Release 4, Release 5, Release 6, Release 7 and Release 8 as well as subsequent the 3G standards, and capable of positioning.

In this embodiment, the system 10 for processing connection from a macro cell base station to a mini type base station comprises a database 101, a receiving module 102 and a searching module 103. In terms of the 3G mobile communication system, the database 101, the receiving module 102 and the searching module 103 are installed in a data center of the 3G mobile communication system. The database 101 stores information related to the geographic distribution for all the macro cell base stations 2, mini type system parameter information and a list of the macro cell base stations 2 that permit the authorized admission of the mobile communication apparatus 4. The list stored in the database 101 corresponds to the list stored in the mini type base station 3.

In this embodiment, the mini type system parameter information comprises the power of signals emitted from the mini type base station 3, the radius coverage of the mini type base station 3, the cell ID of the mini type base station 3 and the IP address of the mini type base station 3.

The receiving module 102 receives information related to the geographic area of the mobile communication apparatus 4 detected by the macro cell base station 2 and the International Mobile Subscriber Identity (IMSI) of the mobile communication apparatus 4. In this embodiment, the macro cell base station 2 detects the geographic area of the mobile communication apparatus 4 on a regular basis. In practice, the macro cell base station 2 detects the geographic area of the mobile communication apparatus 4 every 10 seconds, the time interval of detection is not limited to 10 seconds, it can be changed or set accordingly to the needs of the systems.

The searching module 103, after receiving the geographic area information and the IMSI of the mobile communication apparatus 4 from the receiving module 102, searches the database 101 for at least one of the mini type base stations 3 distributed across the geographic area of the mobile communication apparatus 4, so as for the communication signals of the mobile communication apparatus 4 are switched from the macro cell base station 2 to one of the searched mini type base station 3.

The system for processing connection from a macro cell base station to a mini type base station to achieve the handover of the mobile communication apparatus from a macro cell system to a mini type system.

Figure 1B:
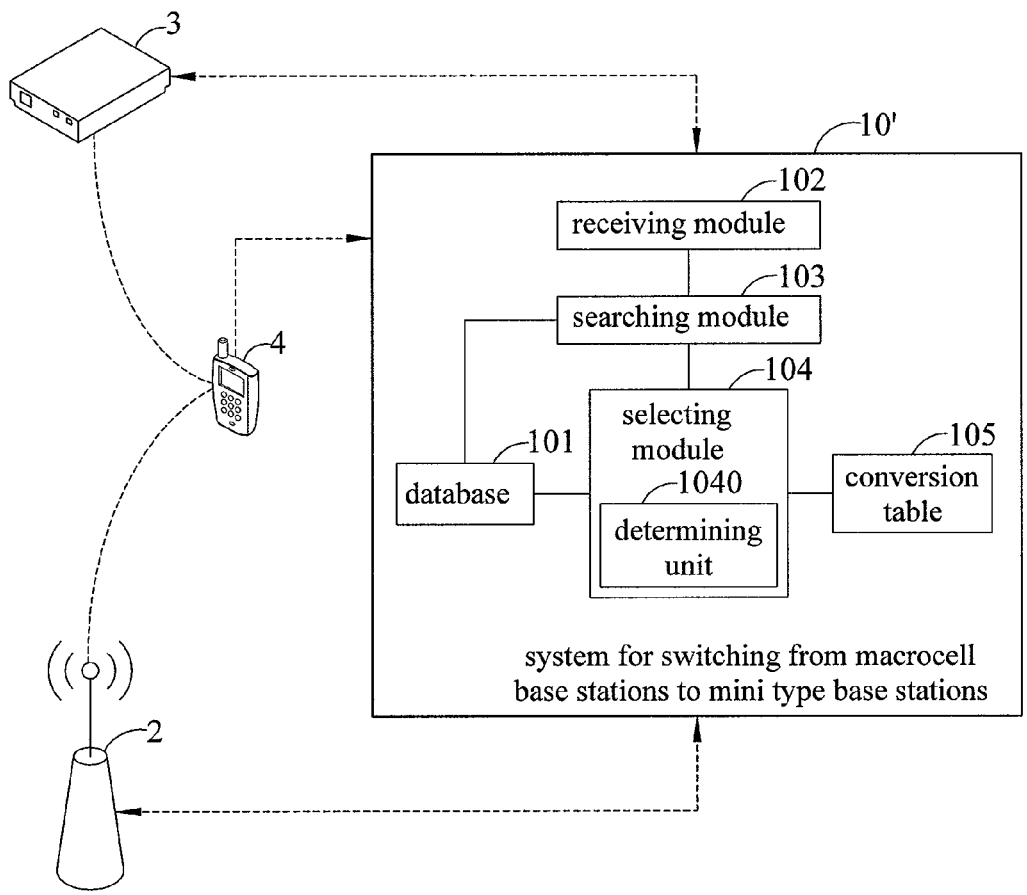
FIG. 1B is a block diagram of a system for processing connection from a macro cell base station to a mini type base station in accordance with another embodiment of the present invention.

FIG. 1B shows a block diagram of a system 10' for processing connection from a macro cell base station to a mini type base station in accordance with another embodiment of the present invention. The present embodiment, which is different from the embodiment illustrated in FIG. 1A in the system 10' comprises a selecting module 104 and a conversion table 105. The searching module 103 of this embodiment, after receiving the geographic area information of the mobile communication apparatus 4 from the receiving module 102 and the IMSI of the mobile communication module 104, searches all mini type base stations 3 distributed across the geographic area according to the geographic area of the mobile communication apparatus 4. For example, if the geographic area of the mobile communication apparatus 4 received by the receiving module 102 is zone A, the searching module 103 will search the database 101 for all mini type base stations 3 distributed in zone A, and list all the searched mini type base stations 3.

The selecting module 104 selects the mini type base stations 3, which permit authorized admission of the mobile communication apparatus 4 and are distributed across the geographic area of the mobile communication apparatus 4 according to all the mini type base stations 3 found by the searching module 103 and the authorized admission list stored in the database 101.

The selecting module 104 creates a conversion table in accordance with the mini type base stations 3 selected and the macro cell base station 2 currently offering communication service to the mobile communication apparatus 4. A target is selected from the conversion table for the conversion. Communication signals of the mobile communication apparatus 4 are switched from the macro cell base station 2 to one of the mini type base stations 3 in the conversion table. Consequently, after the conversion, the mobile communication apparatus 4 communicates with the admitting mini type base station 3.

Also, the selecting module 104 enables the mobile communication apparatus 4 to conduct a survey on communication condition according to the mini type base stations 3 in the conversion table 105 and switch communication signals of the mobile communication apparatus 4 from the macro cell base station 2 to one of the mini type base stations 3 according to the survey result fed back by the mobile communication apparatus 4, wherein one of the mini type base stations 3 having the best communication condition is revealed in the survey result. The mobile communication apparatus 4 communicates with the mini type base station 3, which has the best communication condition.

In other words, the selecting module 104 selects the mini type base stations 3, which fall within the coverage of the macro cell base station 2 located within the geographic area of the mobile communication apparatus 4 and permit an authorized admission of the mobile communication apparatus 4, and the selected mini type base stations 3 are regarded as the switch targets. After moving out the coverage of the macro cell base station 2, the mobile communication apparatus 4 switches to the mini type base stations 3 so as to receive the communication service therefrom. Hence, there is no interruption of communication service of the mobile communication apparatus 4 occurred.

In this embodiment, the selecting module 104 further comprises a determining unit 1040 for determining whether to switch the communication signals of the mobile communication apparatus 4 from the macro cell base station 2 to one of the mini type base stations 3 in the conversion table according to the survey result fed back by the mobile communication apparatus 4. An affirmative determination is followed by the switch, but a negative determination is followed by the receiving module 102 continually receiving the IMSI of the mobile communication apparatus 4 and the geographic area of the mobile communication apparatus 4 detected by the macro cell base station 2.

In this embodiment, switching the communication signals of the mobile communication apparatus 4 from the macro cell base station 2 to one of the mini type base stations 3 in the conversion table is effectuated, using software switching or hardware switching process.

In another embodiment of the present invention, the searching module 103 will search again for the presence of an adjacent mini type base station 3 that falls within the coverage of the macro cell base station 2 only when the receiving module 102 or the searching module 103 receives a change in the geographic area of the mobile communication apparatus 4.

When the system of the present invention is applied to the 3-G mobile communication system mentioned-above, the selecting module 104 and the conversion table 105 shown in FIG. 1B will be installed in the data center of the 3-G mobile communication system.

Figure 2A:
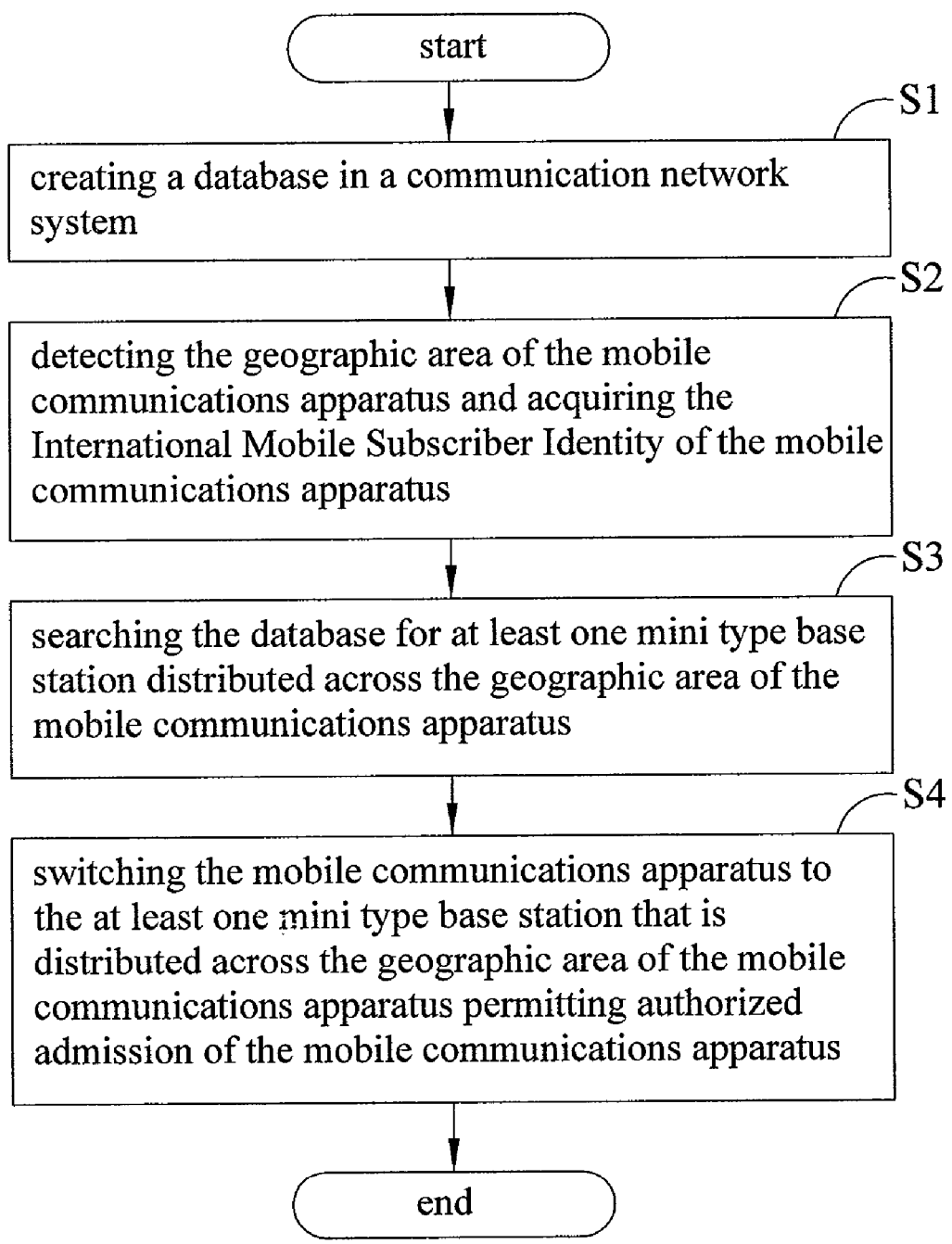
FIG. 2A is a flow chart of a method for processing connection from a macro cell base station to a mini type base station in accordance with an embodiment of the present invention.

Referring to FIG. 2A, a flow chart of a method for processing connection from a macro cell base station to a mini type base station according to an embodiment of the present invention. The method is configured for a use in a communication network system comprising a plurality of macro cell base stations, a plurality of mini type base stations, and at least one mobile communication apparatus. In this embodiment, the communication network system is the 3G mobile communication network system.

In this embodiment, the mobile communication apparatus is exemplified by a mobile terminal of WCDMA and TD-SCDMA, applicable to 3GPP Release 99, Release 4, Release 5, Release 6, Release 7 and Release 8 as well as subsequent 3G standards, and capable of positioning.

The method comprises the steps of:

step S1, wherein a database is created in the communication network system, and the database stores information related to a geographic distribution for a plurality of mini type base stations, a mini type system parameter information, and a list of the mini type base stations that permit authorized admission of a mobile communication apparatus. The authorized admission list stored in the database corresponds to the list stored in the mini type base station for authorized admission of the mobile communication apparatus. In this embodiment, the mini type system parameter information comprises the power of signals emitted from the Femtocell base station, the radius of coverage of the mini type base station, the cell ID of the mini type base station, and the IP address of the mini type base station. Go to step S2;

step S2, wherein the geographic area of the mobile communication apparatus is detected and the IMSI of the mobile communication apparatus is acquired. Go to step S3;

step S3, wherein the database is searched for one of the mini type base stations distributed across the geographic area of the mobile communication apparatus. Go to step S4; and step S4, wherein the mobile communication apparatus is switched to one of the mini type base stations distributed across the geographic area of the mobile communication apparatus and permits an authorized admission of the mobile communication apparatus according to the mini type base station found and the authorized admission list stored in the database.

Figure 2B:
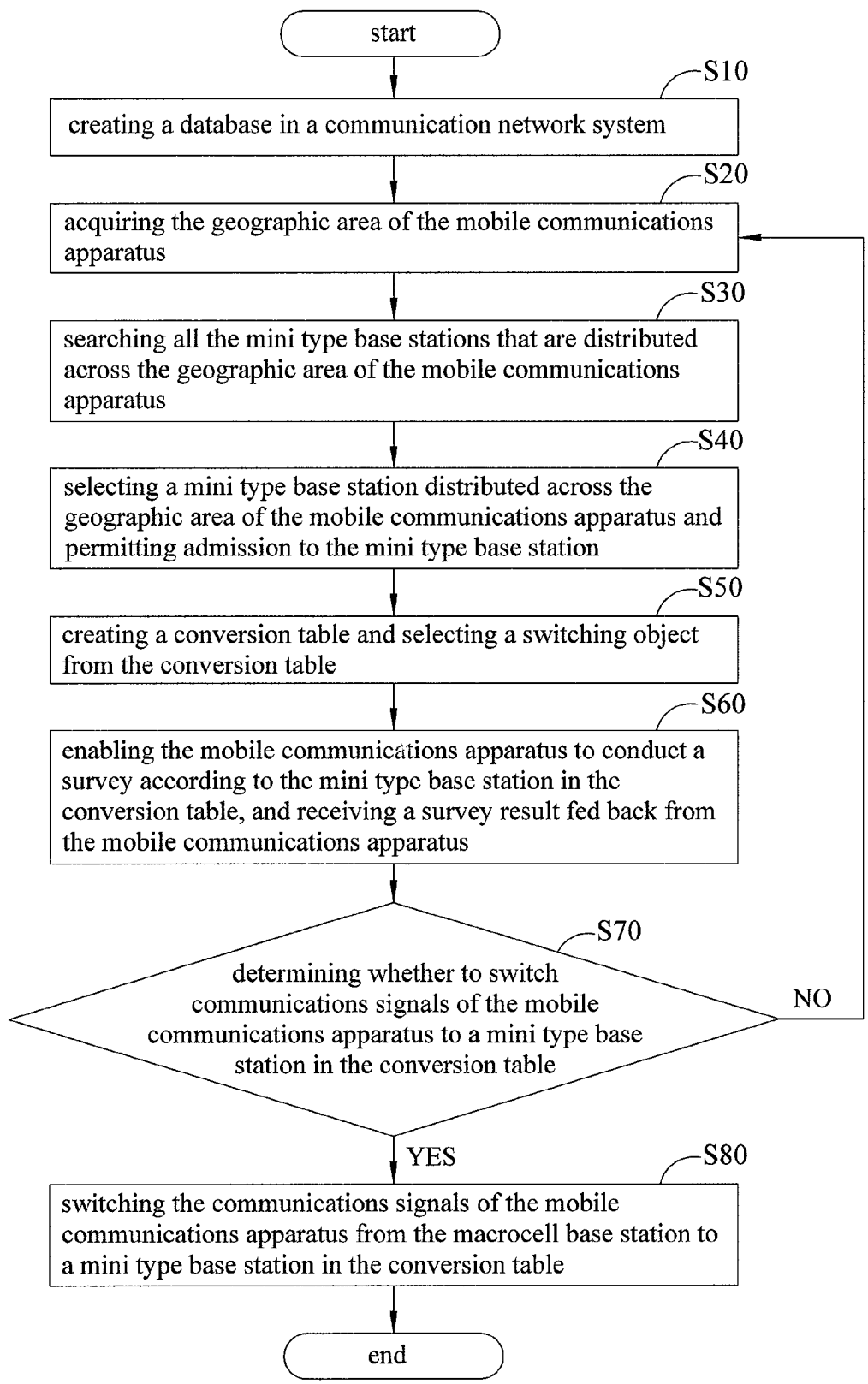
FIG. 2B is a flow chart of a method for processing connection from a macro cell base station to a mini type base station in accordance with another embodiment of the present invention.

Referring to FIG. 2B, a flow chart of a method for processing connection from a macro cell base station to a mini type base station according to another embodiment of the present invention is shown. The present embodiment is different from the embodiment shown in FIG. 2A in which the method of the present embodiment searches all the mini type base stations distributed across the geographic area of the mobile communication apparatus according to the geographic area of the mobile communication apparatus, selects a mini type base station distributed across the geographic area of the mobile communication apparatus and permits the authorized admission to the mobile communication apparatus, to create a conversion table. The method of the present embodiment can be applied to a communication network system comprising a plurality of macro cell base stations, a plurality of mini type base stations, and at least a mobile communication apparatus.

The method of this present embodiment comprises the following steps:

step S10, wherein a database is created in the communication network system to store information related to a geographic distribution for a plurality of mini type base stations, a mini type system parameter information and a list of the mini type base stations that permit the authorized admission of a mobile communication apparatus. The authorized admission list stored in the database corresponds to the list stored in the mini type base station for authorized admission of the mobile communication apparatus. Go to step S20;

step S20, wherein the macro cell base station detects geographic area of the mobile communication apparatus and sends information related to the detected the geographic area and the IMSI of the mobile communication apparatus to the communication network system. In this embodiment, the geographic area of the mobile communication apparatus is detected on a regular basis, for example, every 10 seconds; however, the time interval of detection is not restricted to 10 seconds, and it can be altered according to the requirements of the system. For example, upon detection of a change in the geographic area of the mobile communication apparatus, updated information of the geographic area of the mobile communication apparatus and the IMSI of the mobile communication apparatus are sent to the data center. Go to step S30;

step S30, wherein the communication network system searches the database for all the mini type base stations distributed across the geographic area of the mobile communication apparatus according to the IMSI of the mobile communication apparatus. For example, if the geographic area of the mobile communication apparatus is detected as the zone A in step S20, the data center will search the database for all the mini type base stations located within zone A and then lists all the mini type base stations found in step S30. Go to step S40;

step S40, wherein the communication network system selects the mini type base stations, which are distributed across the geographic area of the mobile communication apparatus and permit the authorized admission of the mobile communication apparatus, according to the found mini type base station and an authorized admission list stored in the database. Go to step S50;

step S50, wherein the communication network system creates a conversion table from the mini type base stations selected and the macro cell base station currently offering communication service to the mobile communication apparatus so that a switch target is selected from the conversion table. Go to step S60;

step S60, wherein the communication network system enables the mobile communication apparatus to conduct a survey on communication condition according to the mini type base stations in the conversion table, and receives a survey result fed back by the mobile communication apparatus. Go to step S70;

step S70, wherein the communication network system determines whether to switch the communication signals of the mobile communication apparatus from the macro cell base station to one of the mini type base stations in the conversion table according to the survey result fed back by the mobile communication apparatus. Upon an affirmative determination, go to step S80. Upon a negative determination, go back to step S20; and step S80, wherein the communication signals of the mobile communication apparatus switch from the macro cell base station to one of the mini type base stations in the conversion table, so as for the mobile communication apparatus to provide communication via the mini type base station. In this embodiment, switching the communication signal of the mobile communication apparatus from the macro cell base station to one of the mini type base stations in the conversion table is operated under the software switching or hardware switching process.

Note that the aforesaid communication network system is operated under the 3G mobile communication system, and under the 3G mobile communication system, the database that stores the authorized admission list and conversion table are installed in a data center of the 3G mobile communication system.

In conclusion, a system and method for switching from a macro cell base station to a mini type base station according to the present invention overcomes a drawback of prior art as follows: the number of the base stations of a mini type system is always a large number, and the system starts and shuts down independently and randomly such that a data center is unable to acquire in advance, therefore, any messages and wireless communication network system parameters of the base station of a nearby mini type system that fall within the coverage of the macro cell system that offers communication service to a mobile communication apparatus cannot be obtained; as a result, it is impossible to inform the mobile communication apparatus of a list of mini type base stations adjacent thereto; thus the mobile communication apparatus cannot detect any signal from a mini type base station and thereby cannot switch to the mini type base station. On the other hand, the present invention the communication signals of the mobile communication apparatus can be switched from the macro cell base station to a base station of a mini type system anytime without any restriction.

The foregoing descriptions of the detailed embodiments are provided to illustrate and disclose the features and functions of the present invention and are not intended to be restrictive of the scope of the present invention. It should be understood by those in the art that many modifications and variations can be made in the aforesaid embodiments according to the spirit and principle of the present invention. Hence, all equivalent modifications and variations made by persons skilled in the art without departing from the spirit and technical philosophy disclosed in the present invention should still fall within the scope of the invention as set forth in the appended claims.

What is claimed is:

1. A system for processing connection from macro cell base stations to mini type base stations, configured to enable an automatic execution of handover as soon as a mobile communication apparatus moves out of coverage of the macro cell base stations into a coverage of the mini type base stations, the system comprising:
- a database for storing information related to a geographic distribution for all the mini type base stations and a list of the mini type base stations permitting an authorized admission of the mobile communication apparatus;
- a receiving module for receiving detected information related to a geographic area of the mobile communication apparatus and International Mobile Subscriber Identity (IMSI) of the mobile communication apparatus; and
- a searching module for searching the database for at least one of the mini type base stations distributed across the geographic area of the mobile communication apparatus according to the geographic area information and the IMSI of the mobile communication apparatus received by the receiving module, and a switching list is established, for the communication signals of the mobile communication apparatus to be switched from the macro cell base station to one of the mini type base stations in the switching list.

2. The system of claim 1, further comprising a selecting module for selecting the mini type base stations which are distributed across the geographic area of the mobile communication apparatus and permit the authorized admission of the mobile communication apparatus according to all the mini type base stations distributed across the geographic area of the mobile communication apparatus searched by the searching module from the database and the authorized admission list stored in the database, and creating a conversion table in accordance with the mini type base stations selected and the macro cell base station currently offering communication service to the mobile communication apparatus to allow the communication signals of the mobile communication apparatus to be switched from the macro cell base station to one of the mini type base stations in the conversion table, so as for the mobile communication apparatus to communicate with the admitting mini type base station.

3. The system of claim 2, wherein the selecting module for enabling the mobile communication apparatus to conduct a survey on communication condition according to the mini type base stations in the conversion table and switch communication signals of the mobile communication apparatus from the macro cell base station to one of the mini type base stations according to a survey result fed back by the mobile communication apparatus, provided that the communication condition survey is satisfactorily conducted on one of the mini type base stations, so that the mobile communication apparatus communicates with the mini type base station that passes the communication condition survey.

4. The system of claim 2 being applied to a third-generation mobile communication system that has a data center, in which the database, the receiving module, the searching module, the selecting module and the authorized admission list are installed.

5. The system of claim 2, wherein the macro cell base station detects the geographic area of the mobile communication apparatus on a regular basis.

6. The system of claim 5, wherein, after the receiving module perceives a change in the geographic area of the mobile communication apparatus, the searching module searches the database according to the IMSI and the geographic area information received by the receiving module.

7. The system of claim 5, wherein the selecting module further comprises a determining unit for determining whether one of the mini type base stations passing the communication condition survey is revealed in the survey result fed back by the mobile communication apparatus, and for determining whether to switch the communication signals of the mobile communication apparatus from the macro cell base station to one of the mini type base stations that appears in the conversion table and passes the communication condition survey as revealed in the communication condition survey report fed back by the mobile communication apparatus, so as for an affirmative determination to be followed by a switch and a negative determination to be followed by resumption of detection performed by the detecting module.

8. The system of claim 1 being applied to a third-generation mobile communication system, in which the database, the receiving module and the searching module are installed.

9. A method for processing connection from macro cell base stations to mini type base stations, configured for use with a communication network system comprising a plurality of macro cell base stations, a plurality of mini type base stations, and a mobile communication apparatus, the method comprising the steps:
- (1) creating a database in the communication network system for storing information related to a geographic distribution for the mini type base stations and a list of the mini type base stations permitting authorized admission of the mobile communication apparatus;
- (2) detecting information related to geographic area of the mobile communication apparatus and acquiring IMSI of the mobile communication apparatus;
- (3) searching the database for at least one of the mini type base stations distributed across the geographic area of the mobile communication apparatus; and
- (4) a switching list is established, for switching the mobile communication apparatus to at least one of the mini type base stations that is distributed across the geographic area of the mobile communication apparatus permitting authorized admission of the mobile communication apparatus according to the searched at least one mini type base station and the authorized admission list stored in the database.

10. The method of claim 9, wherein in step (4) switching the mobile communication apparatus to the at least one mini type base station that is distributed across the geographic area of the mobile communication apparatus permitting authorized admission of the mobile communication apparatus according to the searched at least one mini type base station and the authorized admission list stored in the database to create a conversion table in accordance with the mini type base stations selected and the macro cell base station currently offering communication service to the mobile communication apparatus, and conducting a survey on communication condition according to the mini type base stations in the conversion table so as to switch the communication signal of the mobile communication apparatus from the macro cell base stations to the mini type base stations having passed the communication condition survey according to a survey result and for the mobile communication apparatus to communicate with the mini type base stations having passed the communication condition survey.

11. The method of claim 10, wherein conducting a survey on communication condition according to the mini type base stations in the conversion table so as to switch the communication signals of the mobile communication apparatus from the macro cell base stations to the mini type base stations having passed the communication condition survey according to a survey result and for the mobile communication apparatus to communicate with the mini type base stations having passed the communication condition survey.

12. The method of claim 10, determining whether to switch the communication signal of the mobile communication apparatus from the macro cell base stations to the mini type base stations having passed the communication condition survey according to a survey result performs a switching process when determining that the survey result has a mini type base stations having passed the communication condition survey, or returns to step (2) when the survey result does not have any mini type base stations having passed the communication condition survey.

13. The method of claim 9, wherein, in step (2), the information related to the geographic area of the mobile communication apparatus is detected on a regular basis.

14. The method of claim 13, wherein, in step (2), after detecting that the geographic area of the mobile communication apparatus is changed, the IMSI of the mobile communication apparatus is acquired and step (3) is executed.

* * * * *